(12) United States Patent  
Dellian et al.

(10) Patent No.: US 8,390,209 B2  
(45) Date of Patent: Mar. 5, 2013

(54) CIRCUIT ARRANGEMENT FOR CONVERSION OF AN INPUT AC VOLTAGE TO A DC VOLTAGE, RETROFIT LAMP HAVING A CIRCUIT ARRANGEMENT SUCH AS THIS, AS WELL AS A LIGHTING SYSTEM

(75) Inventors: Harald Dellian, Edling (DE); Wolfram Sowa, Munich (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 398 days.

(21) Appl. No.: 12/702,391

(22) Filed: Feb. 9, 2010

(65) Prior Publication Data

US 2010/0201285 A1    Aug. 12, 2010

(30) Foreign Application Priority Data

Feb. 12, 2009  (DE) .......................... 10 2009 008 635

(51) Int. Cl.  
*H05B 37/02*  (2006.01)

(52) U.S. Cl. .......................... 315/224; 315/291; 315/294
(58) Field of Classification Search .............. 315/185 R, 315/224, 291, 294  
See application file for complete search history.

(56) References Cited

U.S. PATENT DOCUMENTS

| 6,380,693 | B1 | 4/2002 | Kastl |
| 6,411,045 | B1* | 6/2002 | Nerone .......................... 315/291 |
| 6,580,229 | B2* | 6/2003 | Murakami et al. ............ 315/224 |
| 2002/0158590 | A1 | 10/2002 | Saito et al. |
| 2008/0278092 | A1* | 11/2008 | Lys et al. ....................... 315/247 |
| 2009/0066262 | A1 | 3/2009 | Tateishi et al. |
| 2010/0045210 | A1* | 2/2010 | Hariharan ...................... 315/297 |
| 2010/0201285 | A1* | 8/2010 | Dellian et al. ................. 315/294 |
| 2011/0227495 | A1* | 9/2011 | Guest et al. ................... 315/201 |

FOREIGN PATENT DOCUMENTS

| DE | 3612906 A1 | 10/1987 |
| DE | 112006002875 T5 | 11/2008 |
| EP | 1076476 A2 | 2/2001 |

OTHER PUBLICATIONS

Extended European Search Report of EP10152307.4 dated May 26, 2010.  
English abstract for DE 3612906A1.

* cited by examiner

Primary Examiner — Tung X Le

(57) ABSTRACT

A circuit arrangement for conversion of an input AC voltage to a DC voltage is provided. The circuit arrangement may include an input into which the input AC voltage is input; an output to which a load can be connected; and a first storage circuit and a second storage circuit, each storage circuit comprising at least one inductance and each comprising at least one capacitance, and a diode network.

6 Claims, 9 Drawing Sheets

CIRCUIT ARRANGEMENT FOR CONVERSION OF AN INPUT AC VOLTAGE TO A DC VOLTAGE, RETROFIT LAMP HAVING A CIRCUIT ARRANGEMENT SUCH AS THIS, AS WELL AS A LIGHTING SYSTEM

CROSS-REFERENCE TO RELATED APPLICATION

This application claims priority to German Patent Application Serial No. 10 2009 008 635.8, which was filed Feb. 12, 2009, and is incorporated herein by reference in its entirety.

TECHNICAL FIELD

Various embodiments relate to a circuit arrangement for conversion of an input AC voltage to a DC voltage, having an input into which the input AC voltage is input, and having an output to which, for example, a capacitive load can be connected. Various embodiments likewise relate to a retrofit lamp having at least one light-emitting diode for operation on an AC voltage. Various embodiments furthermore relate to a lighting system having an electronic transformer, which produces an amplitude-modulated AC voltage, for low-voltage halogen lamps.

BACKGROUND

Various embodiments are based on a circuit arrangement for conversion of an input AC voltage to a DC voltage.

Parallel operation of low-voltage halogen lamps and LED retrofit lamps is known from U.S. Pat. No. 6,380,693B1. The problem of efficient current limiting for operation of the light-emitting diodes has, however, not been solved there, with only resistors being provided there, for current limiting. As a result of the parallel operation of light-emitting diodes and low-voltage halogen lamps, the power consumed by the light sources falls below the necessary power consumption which is required, for example, in order to allow an electronic transformer for low-voltage halogen lamps to operate. Normally, electronic transformers for low-voltage halogen lamps have no DC voltage as an output signal, but operate the low-voltage halogen lamps with an AC voltage. This AC voltage is at a high frequency, which normally corresponds to the clock frequency of the electronic transformer, and is amplitude-modulated at the input mains frequency.

EP 1 076 476 A2 discloses an apparatus for operation of at least one light-emitting diode, which can be connected to an electronic transformer for halogen lamps, with the apparatus containing a rectifier and a storage circuit.

The fundamental problem of operating one or more light-emitting diodes on an electronic transformer for low-voltage halogen lamps is to offer a resistive load to the electronic transformer for low-voltage halogen lamps. Many electronic transformers for low-voltage halogen lamps are regulated such that the load current must follow the voltage, since, otherwise, the transformers assume that there is a fault, and switch off. The load current can follow the voltage only by assuming a resistive behavior in the system as a load.

In the case of the apparatus disclosed in EP 1 076 476 A2, a storage capacitor C1 is always charged with both half-cycles of the input AC voltage $U_{ET}$, and is therefore never completely discharged. This in turn leads to a pulsed current being drawn, which does not work in many electronic transformers. Furthermore, in this case, resistors are provided for current limiting, which cause losses and are therefore undesirable.

SUMMARY

A circuit arrangement for conversion of an input AC voltage to a DC voltage is provided. The circuit arrangement may include an input into which the input AC voltage is input; an output to which a load can be connected; and a first storage circuit and a second storage circuit, each storage circuit comprising at least one inductance and each comprising at least one capacitance, and a diode network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

Various embodiments specify a circuit arrangement for conversion of an input AC voltage to a DC voltage, having an input into which the input AC voltage is input, and having an output to which a load can be connected, which has a current draw following the voltage.

Various embodiments specify a retrofit lamp having at least one light-emitting diode for operation on an AC voltage, which can be connected to an electronic transformer without an additional conventional load (for example a halogen lamp).

Various embodiments specify a lighting system having an electronic transformer for low-voltage halogen lamps, which operates with semiconductor light sources instead of halogen lamps.

Figure 1:
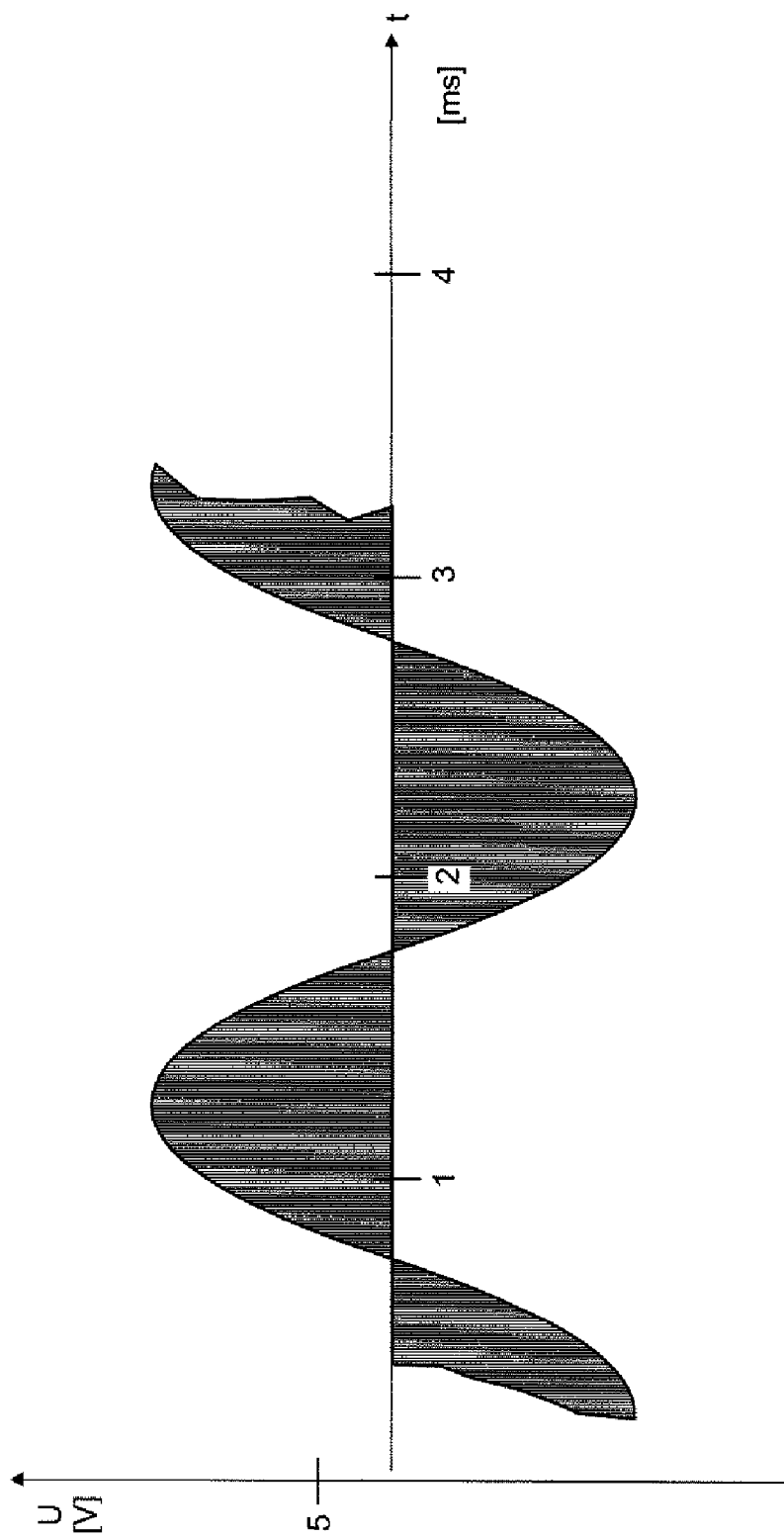
FIG. 1 shows a voltage profile as is output from an electronic transformer.

FIG. 1 shows the typical output voltage as is output by an electronic transformer for low-voltage halogen lamps. The voltage has a low-frequency, amplitude-modulated component and a high-frequency component. The voltage in principle represents a high-frequency square-wave voltage, which has a low-frequency sinusoidal voltage as an envelope curve. The frequency of the high-frequency square-wave voltage is higher by a factor of about 500-1000 than that of the envelope low-frequency sinusoidal voltage.

Figure 2:
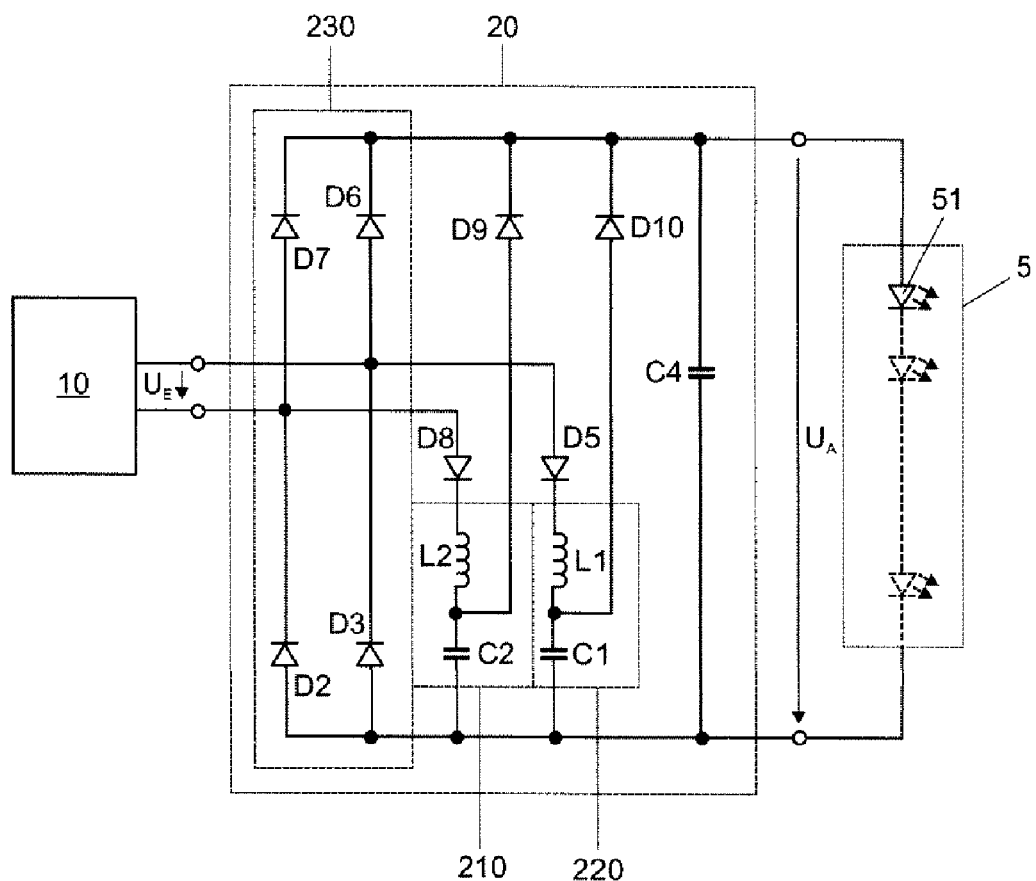
FIG. 2 shows a first embodiment of a circuit arrangement for conversion of an input AC voltage to a DC voltage.

FIG. 2 shows a first embodiment of a circuit arrangement 20 for conversion of an amplitude-modulated input AC voltage to a DC voltage. This first embodiment is a passive embodiment without controlled components. The circuit arrangement 20 has an input to which an AC current source 10 is connected. This AC current source 10 may, for example, be an electronic transformer for low-voltage halogen lamps. The AC current source 10 may, however, likewise be a conventional transformer for low-voltage halogen lamps. The input is connected to the AC voltage side of a full-wave rectifier 230, which includes the diodes D2, D3, D6 and D7. A capacitor C4 is connected in parallel with the DC voltage output of the full-wave rectifier 230. The negative pole of the DC voltage output is the reference potential, and is also referred to in the following text as ground. The (capacitive) load 5 is connected in parallel with the capacitor C4 and, for example, may include one or more light-emitting diodes 51. However, the load 5 may likewise include a circuit arrangement which once again operates one or more light-emitting diodes 51.

A storage circuit 210, 220 is connected to in each case one pole of the input of the circuit arrangement, and its other pole is connected to ground. The storage circuit 210, 220 essentially includes an inductance and a capacitance connected in series. A diode D5, D8 is in each case connected between the storage circuit and the AC voltage input, and rectifies the input voltage. A further diode D9, D10 is in each case connected between the junction point of the capacitance and the inductance and the positive output of the full-wave rectifier 230.

Figure 3:
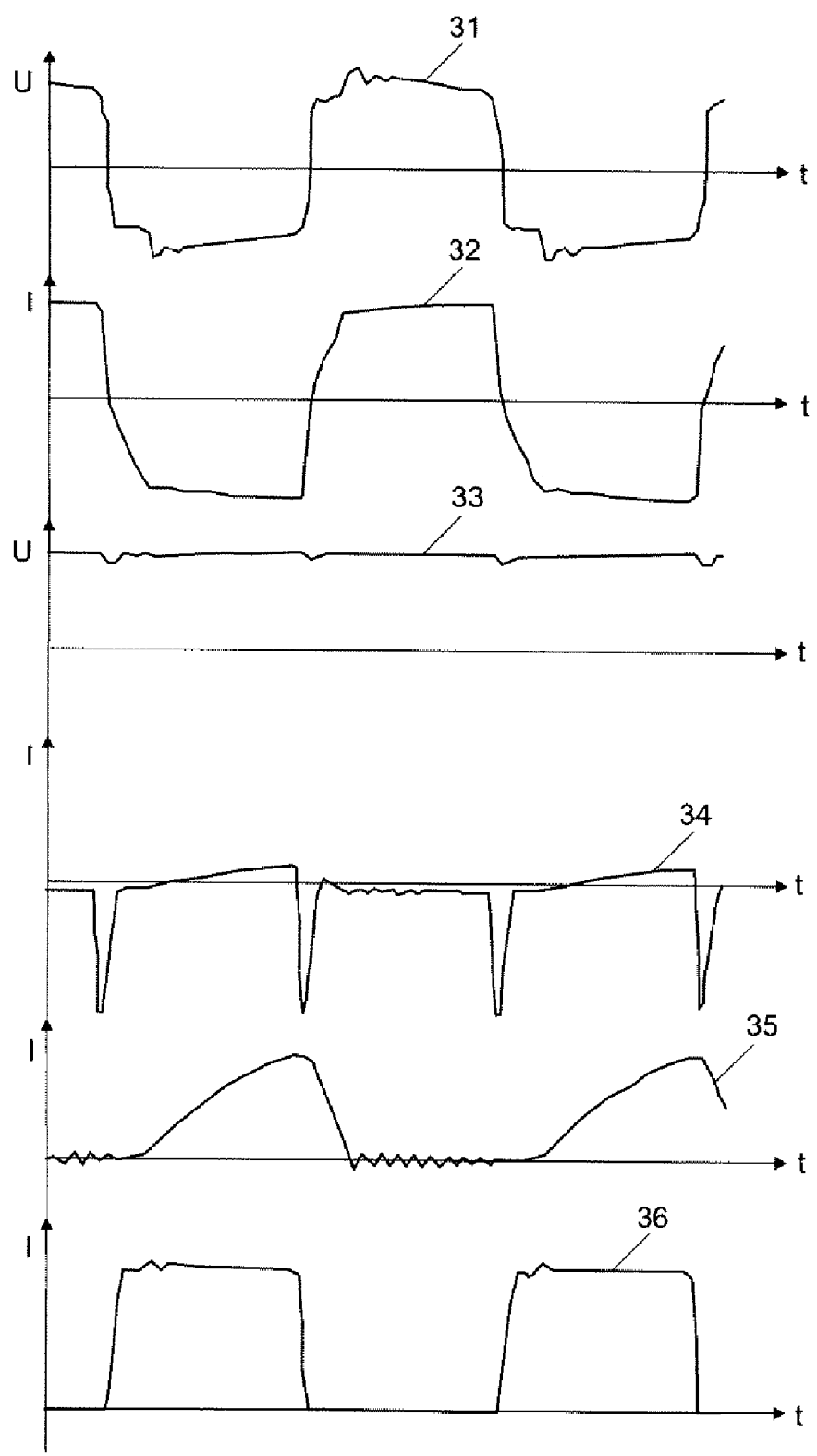
FIG. 3 shows a number of important voltage and current profiles in the circuit arrangement.

FIG. 3 shows a number of important voltage and current profiles in the circuit arrangement 20, illustrating the method of operation of the circuit. The curves are all shown with the same time resolution, as a result of which the method of operation is evident from the position of the curves with respect to one another. The curve 31 shows the input voltage of the circuit arrangement 20 as is produced, for example, by an electronic transformer. The time axis is chosen such that the high-frequency square-wave voltage can be seen, but not its envelope low-frequency sinusoidal voltage. The curve 32 shows the input current of the circuit arrangement 20. This clearly shows that the circuit arrangement 20 represents a resistive load which generates a uniform current draw, following the voltage. The circuit arrangement according to various embodiments supplies power to the load 5 via two paths. Each of these paths may be duplicated, in order to be able to operate separately in the positive half-cycle and in the negative half-cycle. Overall, the circuit arrangement according to various embodiments therefore has four parts, two of which are in each case identical and differ only in that they are respectively active only in the positive or negative half-cycle. The curve 33 shows the voltage across one of the storage capacitors C1 or C2. The voltage profile has small dips on each commutation of the input voltage 31. However, these small dips are small dips only because of the poor time resolution of the illustrated voltage. In reality, the capacitor is discharged completely for a short time during commutation in order then to be charged again after the commutation time. In consequence, a current flow takes place shortly after the commutation, resulting in a more uniform load on the current supply. The current flow is illustrated in the curve 34, which shows the current through the capacitor C1 or the capacitor C2. The curve 35 shows the current flow through the inductance L1. The same current flow occurs one half-cycle later in the inductance L2. The capacitor C1 is charged through the diode D5 and the inductance L1. The power stored in the inductor flows into the capacitor at the commutation time. Finally, the curve 36 shows the current through the diode D6, which belongs to the second current path. The diode D6 is one of the diodes in the full-wave rectifier 230. As can be seen in this case, this current path in which the power flows from the current supply 10 via the full-wave rectifier 230 into the load 5 supplies the majority of the power during one half-cycle. The complementary current path via the diode D7 then supplies the power in the other half-cycle. During the commutation, the current path cannot supply any power because there is no driving voltage, and the current path with the storage circuit therefore provides the power supply during commutation.

The combination of the direct power supply via the diodes D6 and D7 and the power supply via the storage circuits 210 and 220 and the diodes D9 and D10 results in a resistive load being applied to the circuit arrangement, even if the load 5 does not have a resistive behavior.

Figure 4:
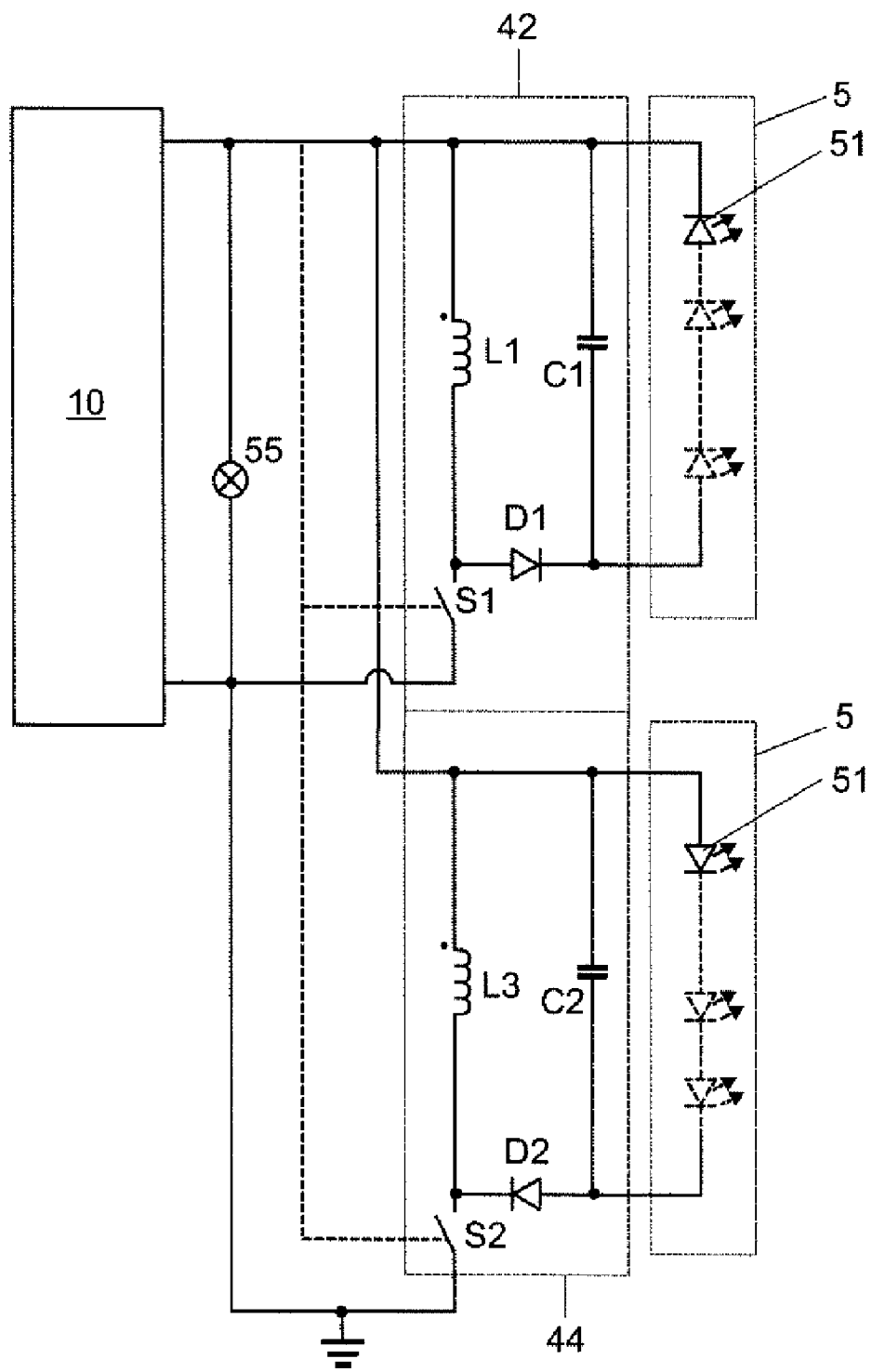
FIG. 4 shows a schematic circuit diagram of a first form of a second embodiment of a circuit arrangement for conversion of an input AC voltage to a DC voltage, with a load split in two.

FIG. 4 shows a schematic circuit diagram of a first form of a second embodiment of a circuit arrangement for conversion of an amplitude-modulated input AC voltage to a DC voltage, with a load split in two. The second embodiment of the circuit arrangement is based on an active principle, in order to apply a resistive load. The second embodiment of the circuit arrangement likewise makes use of the fact that electronic transformers do not produce a direct-current signal but an alternating-current signal which is clocked at a high frequency. The circuit arrangement according to various embodiments contains two independent buck-boost converters 42, 44 which are controlled directly by the output signal, that is to say the alternating-current signal from the electronic transformer 10, which alternating-current signal is clocked at a high frequency, and these converters operate in a complementary manner with respect to one another. The DC voltage converters produce a smooth output voltage via the diodes D1 and D2 as well as the capacitors C1 and C2, respectively, which output voltage can be connected to a load 5 in the form of one of more light-emitting diodes 51. The design of the converters results in inherent current limiting, as a result of which there is no longer any need for any further current-limiting components. By way of example, a low-voltage halogen lamp 55 for the circuit arrangement according to various embodiments is arranged in the circuit diagram.

Figure 5:
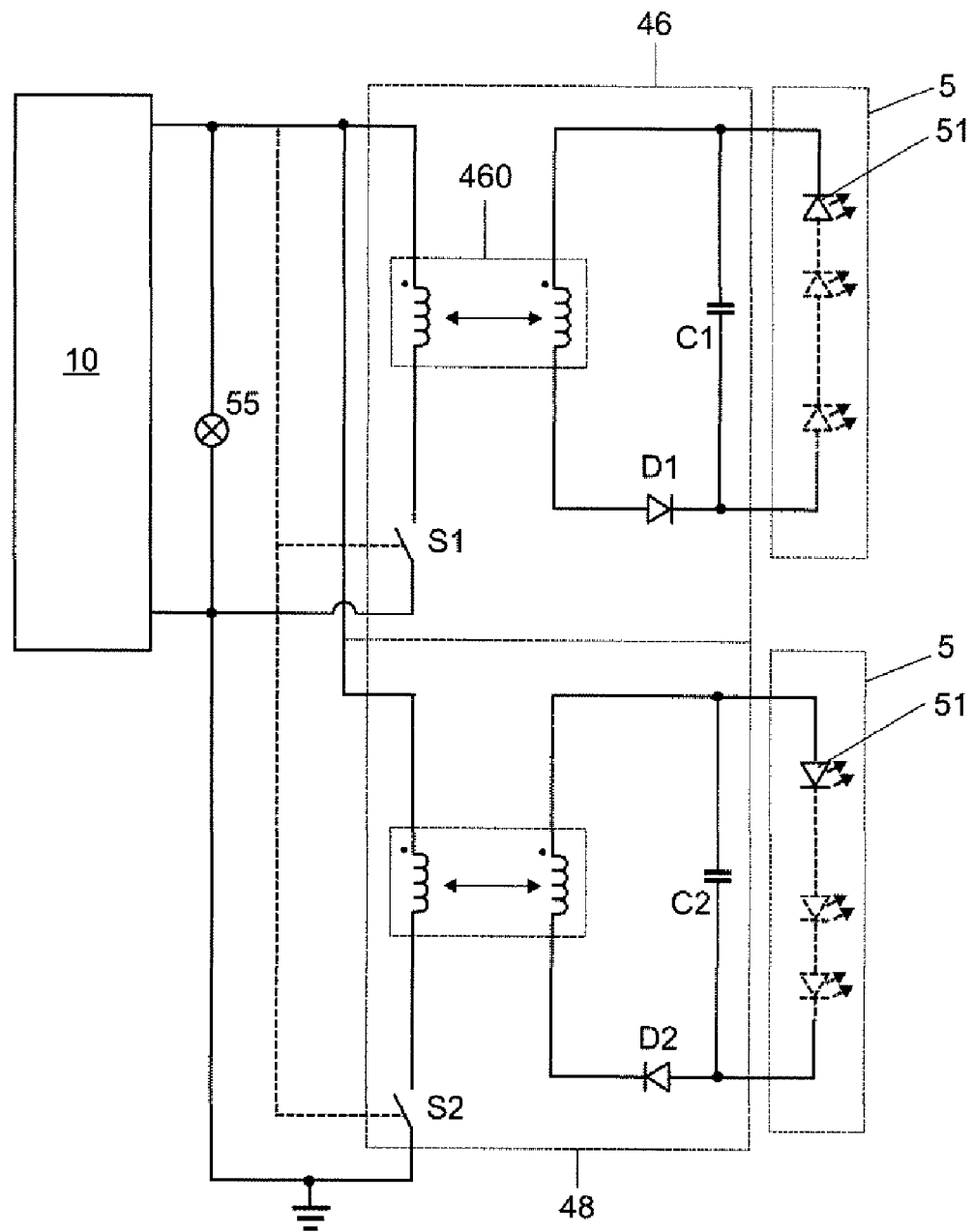
FIG. 5 shows a schematic circuit diagram of a second form of a second embodiment of a circuit arrangement for conversion of an input AC voltage to a DC voltage with a load split in two.

FIG. 5 shows a schematic circuit diagram of a second form of a second embodiment of a circuit arrangement for conversion of an amplitude-modulated input AC voltage to a DC voltage, with a load 5 split in two. Instead of the buck-boost converters 42, 44, the second form uses two flyback converters 46, 48, which supply power to the one or more light-emitting diodes 51 in the load 5. The embodiment in the form of flyback converters has two advantages: the load is galvanically isolated by the transformers 460, 480 in the flyback converters 46, 48, and this results in advantages with regard to the mechanical design and the cooling of the light-emitting diodes. The higher output voltage of the flyback converters allows more light-emitting diodes to be connected in series by means of the case of the first form of the second embodiment. This allows more light-emitting diodes 51 to be operated, and higher power levels to be achieved.

Figure 6:
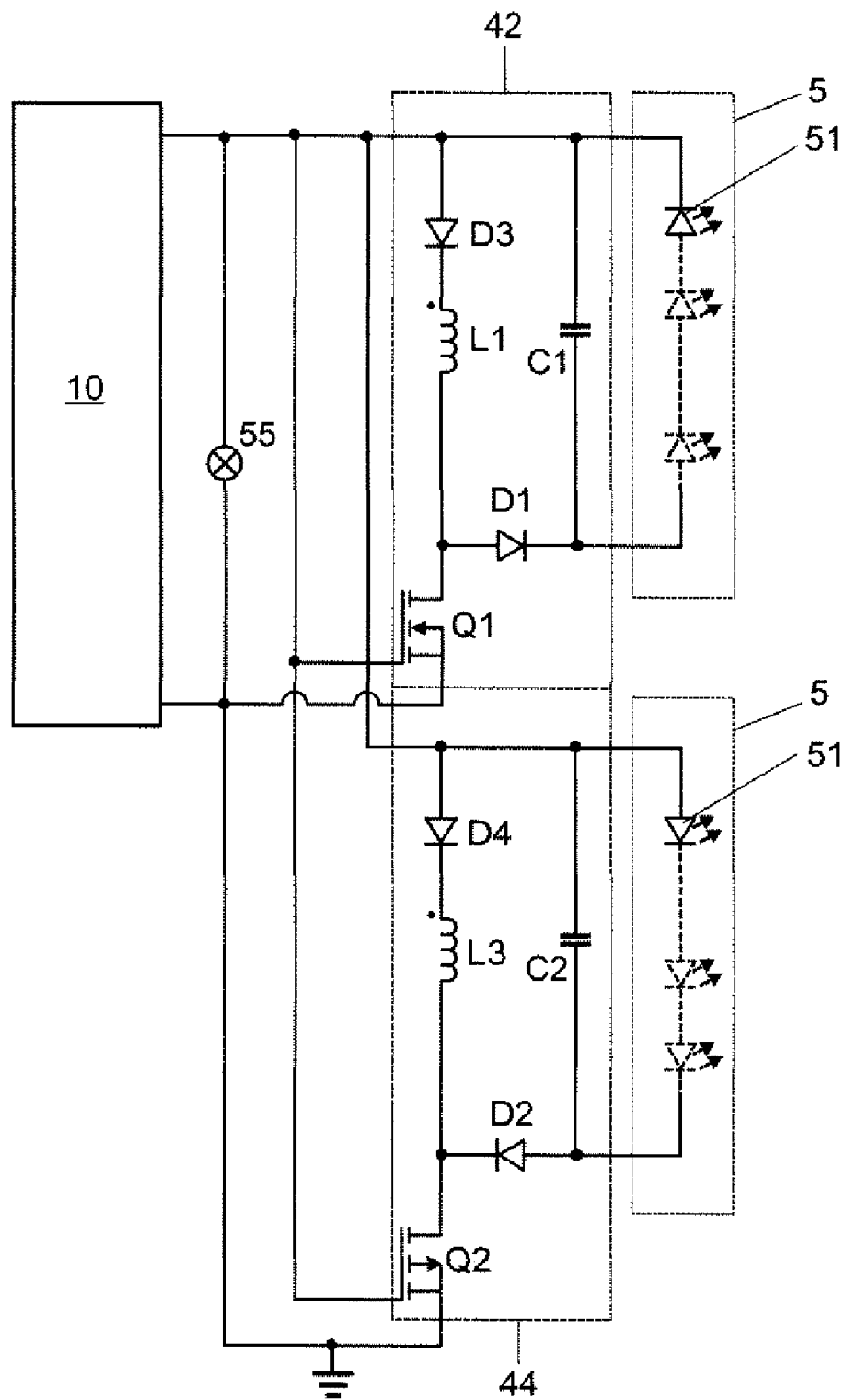
FIG. 6 shows a circuit diagram of a first form of a second embodiment of a circuit arrangement for conversion of an input AC voltage to a DC voltage with a load split in two and with a transistor as a switch.

FIG. 6 shows a circuit diagram of a first form of a second embodiment of a circuit arrangement for conversion of an amplitude-modulated input AC voltage to a DC voltage with a load split in two with a transistor as a switch. The transistors in the two converters would in this case have to be of complementary types for the two converters to operate in a complementary manner with respect to one another. The converters have a respective decoupling diode D3 or D4, preventing the body diodes which are integrated in the transistors from being switched on. This in turn ensures that the inductors L1 and L3 each emit their charge to the load 5. The circuit arrangement uses the output signal from the electronic transformer 10 directly as an input signal for the transistors. This considerably simplifies the circuit, as a result of which it can be produced at very low cost.

Figure 7:
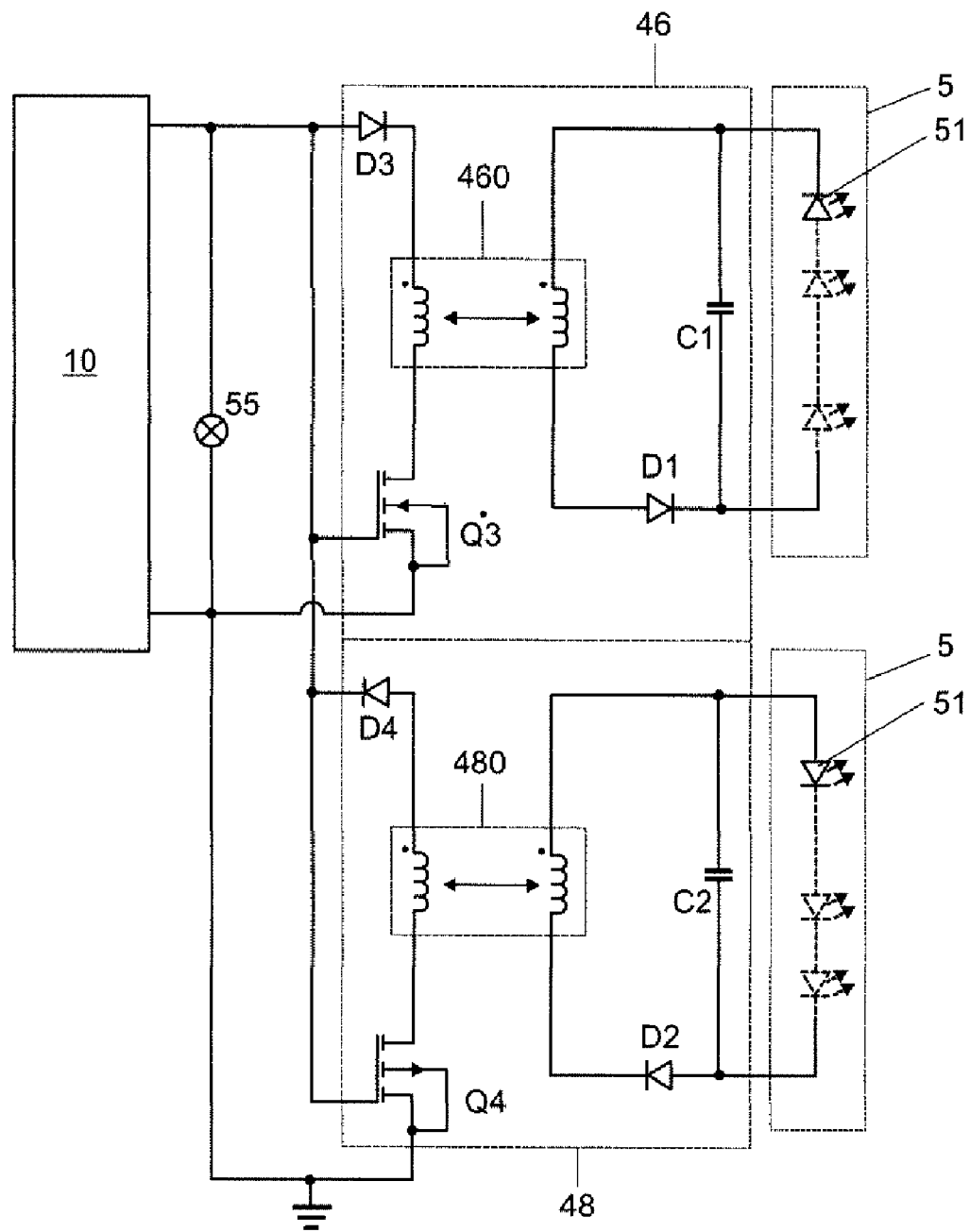
FIG. 7 shows a circuit diagram of a second form of a second embodiment of a circuit arrangement for conversion of an input AC voltage to a DC voltage with a load split in two and with a transistor as a switch.

FIG. 7 shows a circuit diagram of a second form of a second embodiment of a circuit arrangement for conversion of an amplitude-modulated input AC voltage to a DC voltage with a load split in two and with a transistor as a switch. In this case as well, the transistors in the two flyback converters 46, 48 would in this case have to be of complementary types for the two flyback converters 46, 48 to operate in a complementary manner with respect to one another. The flyback converters 46, 48 have a respective decoupling diode D3 or D4, which prevents the body diodes which are integrated in the transistors from being switched on. This means that the transformers 460, 480 in the two flyback converters 46, 48 are demagnetized via their respective secondary windings, and the power can therefore flow to the load. The second form also uses the output signal from the electronic transformer 10 directly as an input signal for the transistors Q3 and Q4. This likewise may considerably simplify the circuit, as a result of which it can be produced at very low cost.

Figure 8:
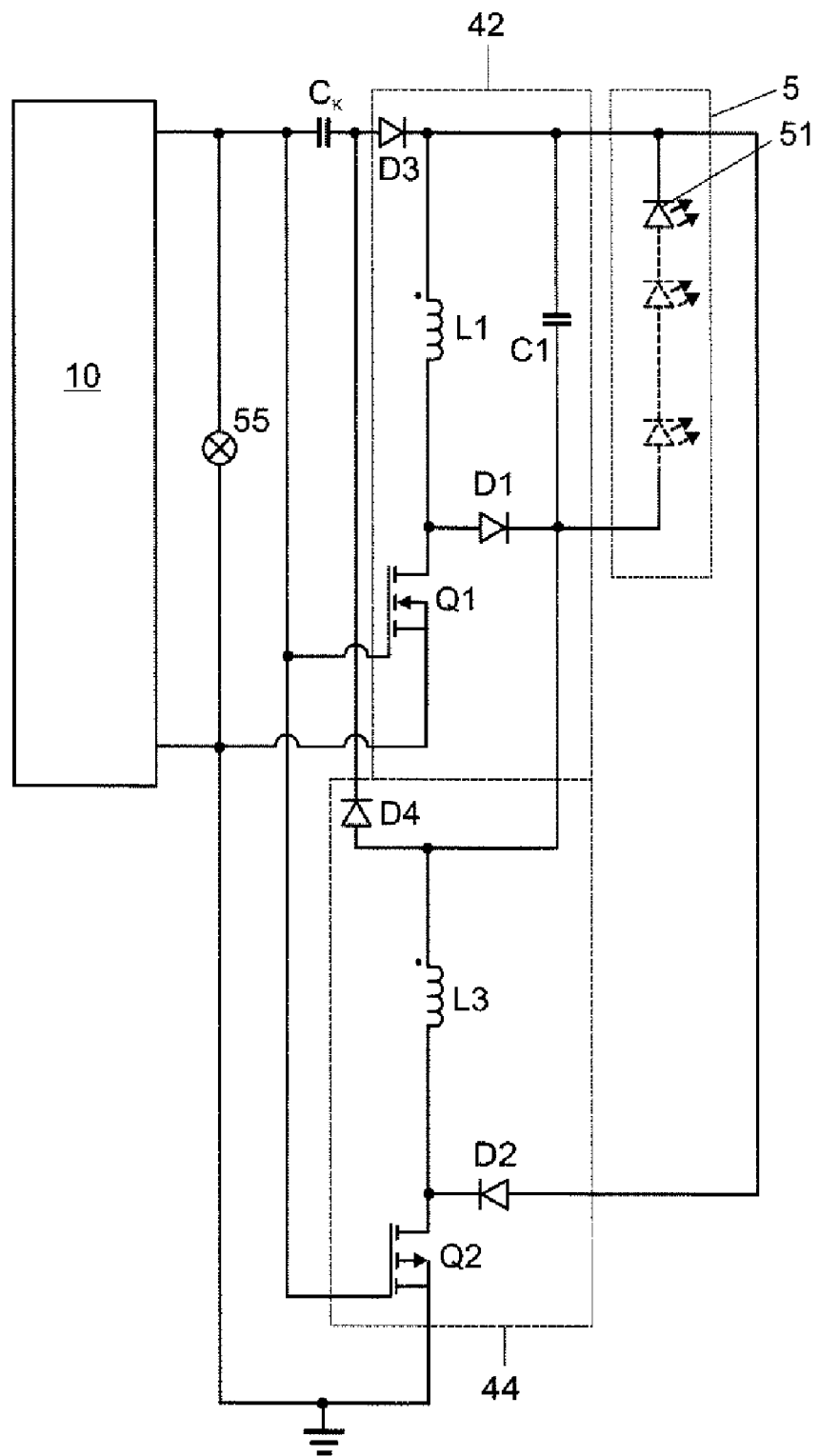
FIG. 8 shows a circuit diagram of a second form of a second embodiment of a circuit arrangement for conversion of an input AC voltage to a DC voltage with a single load and with a transistor as a switch.

Finally, FIG. 8 shows a circuit diagram of a first form of a second embodiment, of a circuit arrangement for conversion of an amplitude-modulated input AC voltage to a DC voltage with a single load and with a transistor as a switch. In this case, the two inductors act alternately on the energy-storage capacitor C1. The load 5 with the light-emitting diodes 51 is connected in parallel with the energy-storage capacitor. The two buck-boost converters have a coupling capacitor $C_k$ at their input, which ensures that the operation of the circuit arrangement according to various embodiments does not cause any damage to a conventional transformer. The two diodes D3 and D4 are once again used for decoupling the diodes from the input.

Figure 9:
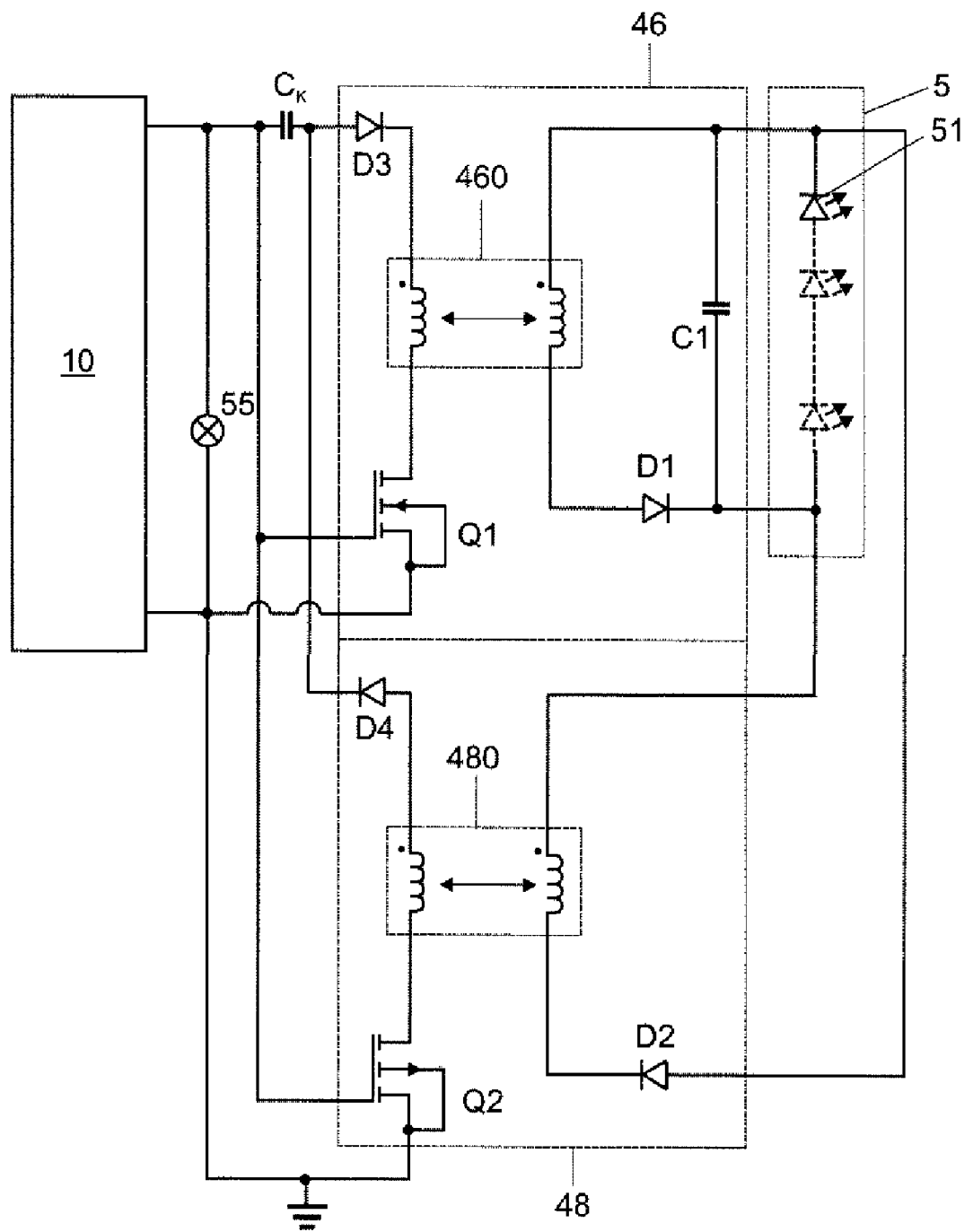
FIG. 9 shows a circuit diagram of a first form of a second embodiment of a circuit arrangement for conversion of an input AC voltage to a DC voltage with a single load and with a transistor as a switch.

FIG. 9 shows a circuit diagram of a second form of a second embodiment of a circuit arrangement for conversion of an amplitude-modulated input AC voltage to a DC voltage with a single load and a transistor as a switch. The outputs of the two flyback converters 46, 48 in this case both act on the storage or energy-storage capacitor C1, which is once again connected in parallel with the load 5 with the light-emitting diodes 51. In this case as well, a coupling capacitor $C_k$ is once again used for decoupling of the circuit arrangement according to various embodiments with an upstream transformer.

In various embodiments, a circuit arrangement for conversion of an input AC voltage to a DC voltage is provided, having an input into which the input AC voltage is input, and having an output to which a load can be connected, wherein the circuit arrangement has a first storage circuit and a second storage circuit, each storage circuit having at least one inductance and each having at least one capacitance, as well as a diode network. Since the circuit arrangement has two storage circuits, one storage circuit can always be completely discharged while the other storage circuit is currently being charged, as a result of which a charging current flows, even at very low voltages, during the next charge process of the previously discharged storage circuit.

The diode network may be configured such that the first storage circuit is charged during each positive half-cycle of the input AC voltage and discharged during the negative half-cycle of the input AC voltage, and the second storage circuit is in each case charged during the negative half-cycle of the input AC voltage, and is discharged during the positive half-cycle of the input AC voltage. This measure may allow a uniform power to be produced at the output, even though each storage element is always cyclically completely discharged in both storage circuits.

The diode network may also have a full-wave rectifier whose AC voltage side is connected to the input, and whose DC voltage side is connected to the output. This measure may result in the output being supplied with power not only via the storage circuits but also directly, thus making it possible to design the component values of the storage circuits to be small and cost-effective.

In various embodiments, a circuit arrangement for conversion of an input AC voltage to a DC voltage is provided, having an input into which the input AC voltage is input, and having an output to which a load can be connected, wherein the circuit arrangement has two voltage converters into which the input AC voltage and the voltage converters operate in a complementary form with respect to the input AC voltage, and are clocked synchronously with it. The complementary method of operation guarantees that current is drawn continuously, with the synchronous clocking resulting in the current that is drawn following the voltage, thus also simulating a resistive load in this case.

In this case two voltage converters which operate alternately are considered to be a voltage converter which operates in a complementary manner, that is to say the switch in the first voltage converter is switched on during the positive half-cycle, and the switch in the second voltage converter is switched on during the negative half-cycle.

The voltage converters may be flyback converters or inverse converters. This may have the effect that it is also possible to operate loads which require a higher voltage than the input voltage. However, the voltage converters may also be step-down voltage converters. This then allows loads to be operated which require a lower voltage than the input voltage. The switches in the voltage converters are in this case preferably in the form of transistors. Since the voltage converters operate in a complementary manner with respect to one another, the transistors in the voltage converters may likewise be complementary with respect to one another. This may ensure that they can be driven easily.

With regard to the retrofit lamp, a retrofit lamp may be provided having at least one semiconductor light source for operation on an AC voltage, wherein the retrofit lamp has a circuit arrangement with the features of the first embodiment or a circuit arrangement with the features of the second embodiment, wherein the input of the circuit arrangement may be connected to the AC voltage, and a voltage for operation of the at least one light-emitting diode is produced at the output of the circuit arrangement.

In this case, the retrofit lamp may be operated on a high-frequency AC voltage which is produced by an electronic transformer for low-voltage halogen lamps. Electronic transformers normally produce an AC voltage which is at a high modulated frequency and is at the same time amplitude-modulated at a low frequency. The high frequency is in this case the clock frequency of the converter in the electronic transformer, and the low clock frequency is the mains frequency. The output signal from the electronic transformer thus has an AM component and an FM component.

With regard to the lighting system, a lighting system may be provided having an electronic transformer for low-voltage halogen lamps, wherein the lighting system has a retrofit lamp having the abovementioned features and, wherein the retrofit lamp is connected to the electronic transformer for low-voltage halogen lamps.

LIST OF REFERENCE SYMBOLS

10 AC current source
20 Circuit arrangement according to an embodiment
230 Full-wave rectifier
210 Storage circuit
220 Storage circuit
31 Input voltage to the circuit arrangement
32 Input current to the circuit arrangement
33 Voltage across the capacitor C1 or C2
34 Current through the capacitor C1 or C2
35 Current through the inductance L1 or L2
36 Current through the diode D6 or D7
42 Buck-boost converter
44 Buck-boost converter
46 Flyback converter
460 Flyback converter transformer
48 Flyback converter
480 Flyback converter transformer
5 Load
51 Light-emitting diodes
55 Low-voltage halogen lamp While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement for conversion of an input AC voltage to a DC voltage, the circuit arrangement comprising: an input into which the input AC voltage is input; an output to which a load is configured to be connected; and a first storage circuit and a second storage circuit, each storage circuit comprising at least one inductance and each comprising at least one capacitance, and a diode network,
    wherein the diode network is configured such that the first storage circuit is in each case charged during the positive half-cycle of the input AC voltage and discharged during the negative half-cycle of the input AC voltage, and the second storage circuit is in each case charged during the negative half-cycle of the input AC voltage, and is discharged during the positive half-cycle of the input AC voltage.

2. The circuit arrangement as claimed in claim 1, wherein the diode network comprises a full-wave rectifier, whose AC voltage side is connected to the input, and whose DC voltage side is connected to the output.

3. A retrofit lamp, comprising:
    at least one semiconductor light source for operation on an AC voltage; and
    a circuit arrangement for conversion of an input AC voltage to a DC voltage, the circuit arrangement comprising:
    an input into which the input AC voltage is input; and
    an output to which the light source is configured to be connected;
    a first storage circuit and a second storage circuit, each storage circuit comprising at least one inductance and each comprising at least one capacitance, and a diode network;
    wherein the input of the circuit arrangement is connected to the AC voltage, and a voltage for operation of the at least one semiconductor light source is produced at the output of the circuit arrangement,
    wherein the diode network is configured such that the first storage circuit is in each case charged during the positive half-cycle of the input AC voltage and discharged during the negative half-cycle of the input AC voltage, and the second storage circuit is in each case charged during the negative half-cycle of the input AC voltage, and is discharged during the positive half-cycle of the input AC voltage.

4. The retrofit lamp as claimed in claim 3, wherein the semiconductor light source is selected from a group consisting of: a light-emitting diode and an organic light-emitting diode.

5. The retrofit lamp as claimed in claim 3, wherein the retrofit lamp is configured to be operated on a high-frequency AC voltage which is produced by an electronic transformer for low-voltage halogen lamps.

6. A lighting system, comprising: an electronic transformer for low-voltage halogen lamps, a retrofit lamp, comprising: at least one semiconductor light source for operation on an AC voltage; and a circuit arrangement for conversion of an input AC voltage to a DC voltage, the circuit arrangement comprising: an input into which the input AC voltage is input; and an output to which the light source is configured to be connected; a first storage circuit and a second storage circuit, each storage circuit comprising at least one inductance and each comprising at least one capacitance, and a diode network; wherein the input of the circuit arrangement is connected to the AC voltage, and a voltage for operation of the at least one semiconductor light source is produced at the output of the circuit arrangement; wherein the retrofit lamp is connected to the electronic transformer for the low-voltage halogen lamps,
    wherein the diode network is configured such that the first storage circuit is in each case charged during the positive half-cycle of the input AC voltage and discharged during the negative half-cycle of the input AC voltage, and the second storage circuit is in each case charged during the negative half-cycle of the input AC voltage, and is discharged during the positive half-cycle of the input AC voltage.

* * * * *